(12) United States Patent
Lin et al.

(10) Patent No.: US 9,720,248 B2
(45) Date of Patent: Aug. 1, 2017

(54) LIQUID CRYSTAL LENS, FABRICATION METHOD THEREOF AND DISPLAY DEVICE

(71) Applicant: BOE TECHNOLOGY GROUP CO., LTD., Beijing (CN)

(72) Inventors: Chia Chiang Lin, Beijing (CN); Kun Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 171 days.

(21) Appl. No.: 14/429,871

(22) PCT Filed: May 29, 2014

(86) PCT No.: PCT/CN2014/078854
§ 371 (c)(1),
(2) Date: Mar. 20, 2015

(87) PCT Pub. No.: WO2015/100934
PCT Pub. Date: Jul. 9, 2015

(65) Prior Publication Data
US 2016/0025988 A1 Jan. 28, 2016

(30) Foreign Application Priority Data
Dec. 30, 2013 (CN) .......................... 2013 1 0745494

(51) Int. Cl.
G02F 1/1337 (2006.01)
G02B 27/22 (2006.01)
(Continued)

(52) U.S. Cl.
CPC ........... *G02B 27/225* (2013.01); *G02B 27/22* (2013.01); *G02F 1/1337* (2013.01);
(Continued)

(58) Field of Classification Search
CPC .... G02B 27/225; G02B 27/22; G02F 1/13439
See application file for complete search history.

(56) References Cited

U.S. PATENT DOCUMENTS 6,642,984 B1 * 11/2003 Yoshida ............ G02F 1/133707
349/139
7,864,275 B2  1/2011 Teramoto et al.
(Continued)

FOREIGN PATENT DOCUMENTS

CN 2001-330732 A 11/2001
CN 101506729 A 8/2009
(Continued)

OTHER PUBLICATIONS

First Chinese Office Action Appln. No. 201310745494.1; Dated Sep. 25, 2015.
(Continued)

*Primary Examiner* — Sang V Nguyen
(74) *Attorney, Agent, or Firm* — Ladas & Parry LLP; Loren K. Thompson

(57) ABSTRACT

A liquid crystal lens, a fabrication method thereof and a display device are provided, the liquid crystal lens comprises: a first substrate (1); a second substrate (2), opposed to the first substrate (1); a liquid crystal layer (3), interposed between the first substrate (1) and the second substrate (2); a first transparent electrode layer (5), located on a side of the first substrate (1) close to the liquid crystal layer (3); a planarization layer (6), located on a side of the first transparent electrode layer (5) close to the liquid crystal layer (3); a first alignment layer (4), located on a side of the planarization layer (6) close to the liquid crystal layer (3); a second transparent electrode layer (7), disposed on a side of the second substrate (2) close to the liquid crystal layer; a second alignment layer (8), disposed on a side of the second transparent electrode layer (7) close to the liquid crystal
(Continued)

layer (3). The first alignment layer (4) is moved to a position where an lateral electric field is weaker, by forming the planarization layer (6) between the first transparent electrode layer (5) and the first alignment layer (4), which thus reduces a liquid crystal phase deviation and improves a refractive effect of the liquid crystal lens.

7 Claims, 2 Drawing Sheets

(51) Int. Cl.
      *G02F 1/29*        (2006.01)
      *G02F 1/1343*        (2006.01)
      *G02F 1/1333*        (2006.01)

(52) U.S. Cl.
      CPC ............ *G02F 1/13439* (2013.01); *G02F 1/29* (2013.01); *G02F 2001/133357* (2013.01); *G02F 2001/294* (2013.01)

(56) References Cited

U.S. PATENT DOCUMENTS

| | | | | |
|---|---|---|---|---|
| 2005/0157226 | A1* | 7/2005 | Lan | G02F 1/133514 349/106 |
| 2006/0273284 | A1* | 12/2006 | Hirose | G02B 3/14 252/299.61 |
| 2011/0228181 | A1* | 9/2011 | Jeong | G02B 5/1842 349/15 |
| 2013/0160942 | A1* | 6/2013 | Zuidema | G02B 3/0012 156/277 |
| 2013/0194198 | A1* | 8/2013 | Guard | G06F 3/044 345/173 |
| 2014/0055716 | A1* | 2/2014 | Zhang | G02F 1/133512 349/64 |
| 2014/0111083 | A1* | 4/2014 | Guo | H01J 29/08 313/497 |
| 2015/0077669 | A1* | 3/2015 | Wu | G02B 27/22 349/33 |

FOREIGN PATENT DOCUMENTS

| | | | |
|---|---|---|---|
| CN | 102193202 A | 9/2011 | |
| CN | 103235462 * | 8/2013 | ........... G02F 1/1343 |
| CN | 103235462 A | 8/2013 | |
| CN | 103278993 A | 9/2013 | |
| CN | 203187666 U | 9/2013 | |
| CN | 203287665 U | 11/2013 | |
| CN | 203287666 U | 11/2013 | |
| CN | 103713441 A | 4/2014 | |

OTHER PUBLICATIONS

Second Chinese Office Action dated Mar. 10, 2016; Appln. No. 201310745494.1.

International Search Report Appln. No. PCT/CN2014/078854; Dated Sep. 30, 2014.

Written Opinion of the International Searching Authority Appln. No. PCT/CN2014/078854; Dated Sep. 30, 2014.

* cited by examiner

LIQUID CRYSTAL LENS, FABRICATION METHOD THEREOF AND DISPLAY DEVICE

TECHNICAL FIELD

Embodiments of the present invention relate to a liquid crystal lens, a fabrication method thereof and a display device.

BACKGROUND

A three-dimensional stereoscopic display technology is mainly divided into a naked-eye type and a glasses type, wherein the naked-eye type stereoscopic display mainly includes lenticular lens grating stereoscopic display and slit grating stereoscopic display.

In order to achieve a better stereoscopic display effect, currently a liquid crystal lens is designed by using oblique electrodes, as shown in FIG. 1, the liquid crystal lens comprises a first substrate 1, a second substrate 2, a liquid crystal layer 3 between the first substrate 1 and the second substrate 2, a first transparent electrode layer 5 and a first alignment layer 4 located on a side of the first substrate 1 close to the liquid crystal layer 3, as well as a second transparent electrode layer 7 and a second alignment layer 8 located on a side of the second substrate 2 close to the liquid crystal layer 3. During operation, a relatively large voltage difference is formed between the first transparent electrode layer 5 of the first substrate 1 and the second transparent electrode layer 7 of the second substrate 2, and meanwhile, a relatively small voltage difference is formed between two adjacent transparent electrodes in the first transparent electrode layer 5, a lateral electric field is formed between the two adjacent transparent electrodes, and an alignment direction of the first alignment layer 4 is not parallel to a direction of the lateral electric field, which thereby generates a liquid crystal phase deviation.

As shown in FIG. 2, since in the liquid crystal lens having the oblique electrode, there is a relatively large lateral electric field at a position close to the electrodes where a pre-tilt direction of liquid crystal is not parallel to the direction of the electric field, the liquid crystal phase deviation is generated, and at the position, a variation of refractivity is not smooth, which reduces a refractive effect of the liquid crystal lens and thus affects a stereoscopic display effect.

SUMMARY OF THE INVENTION

Embodiments of the present invention provide a liquid crystal lens, a fabrication method thereof and a display device, for improving a refractive effect of the liquid crystal lens.

In one aspect, an embodiment of the present invention provides a liquid crystal lens, comprising: a first substrate; a second substrate, opposed to the first substrate; a liquid crystal layer, interposed between the first substrate and the second substrate; a first transparent electrode layer, located on a side of the first substrate close to the liquid crystal layer; a planarization layer, located on a side of the first transparent electrode layer close to the liquid crystal layer; a first alignment layer, located on a side of the planarization layer close to the liquid crystal layer; a second transparent electrode layer, disposed on a side of the second substrate close to the liquid crystal layer; and a second alignment layer, disposed on a side of the second transparent electrode layer close to the liquid crystal layer.

In another aspect, an embodiment of the present invention further provides a fabrication method of a liquid crystal lens, the method comprising: sequentially forming a first transparent electrode layer, a planarization layer and a first alignment layer on a first substrate; sequentially forming a second transparent electrode layer and a second alignment layer on a second substrate; cell-assembling the first substrate provided with the first transparent electrode layer, the planarization layer and the first alignment layer thereon and the second substrate provided with the second transparent electrode layer and the second alignment layer thereon, and injecting a liquid crystal, so as to form the liquid crystal lens.

An embodiment of the present invention further provides a display device, comprising: a display panel; and the above-described liquid crystal lens, disposed on a light exiting side of the display panel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
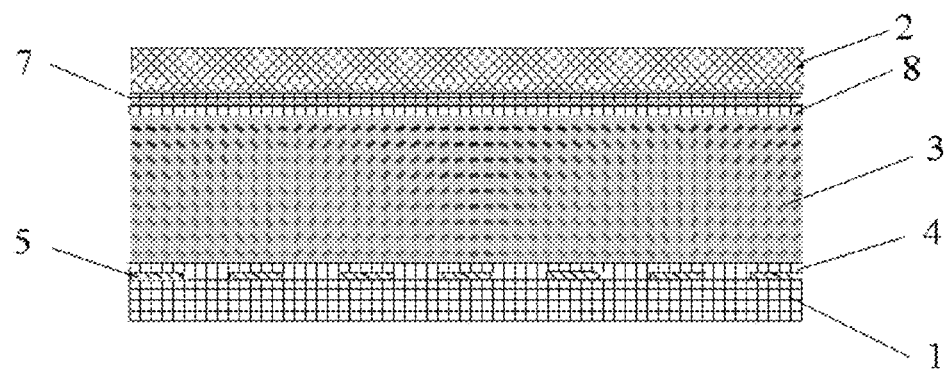
FIG. 1 is a structural schematic diagram of a liquid crystal lens in prior art.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Here it should be noted that the accompanying drawings provided by embodiments of the present invention are only intended to better illustrate a structure of a liquid crystal lens according to embodiments of the present invention, while sizes and shapes of the liquid crystal lens shown in the drawings do not limit the actual technical solution, for example, actual heights of a first substrate, a first transparent electrode layer, a planarization layer and a first alignment layer, etc. are not equal to sizes shown in the drawings, and the actual sizes may be sizes known by the inventor.

A First Embodiment

Figure 3:
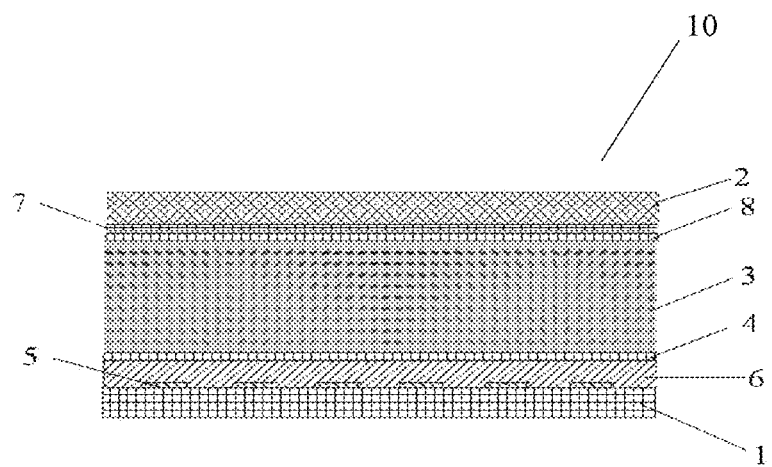
FIG. 3 is a structural schematic diagram of a liquid crystal lens provided by an embodiment of the present invention.

Av embodiment of the present invention provides a liquid crystal lens, and FIG. 3 shows a structural schematic diagram of the liquid crystal lens provided by an embodiment of the present invention, the liquid crystal lens 10 comprising: a first substrate 1; a second substrate 2, opposed to the first substrate 1; a liquid crystal layer 3, interposed between the first substrate 1 and the second substrate 2; a first transparent electrode layer 5, disposed on a side of the first substrate 1 close to the liquid crystal layer 3; a planarization layer 6, disposed on a side of the first transparent electrode layer 5 close to the liquid crystal layer 3; a first alignment layer 4, disposed on a side of the planarization layer 6 close to the liquid crystal layer 3; a second transparent electrode layer 7, disposed on a side of the second substrate 2 close to the liquid crystal layer 3; a second alignment layer 8, disposed on a side of the second transparent electrode layer 7 close to the liquid crystal layer 3, wherein the second transparent electrode layer 7 is a plane electrode or comprises a plurality of strip electrodes.

Figure 4:
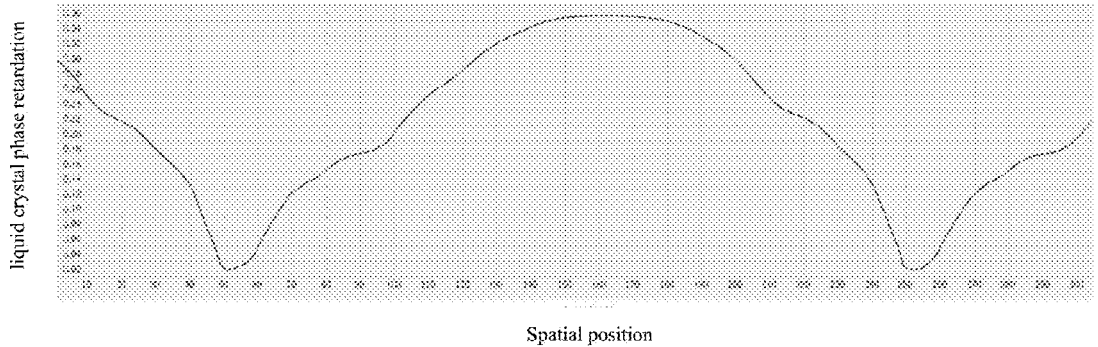
FIG. 4 is a refractivity variation diagram in a horizontal cross-section of the liquid crystal lens provided by an embodiment of the present invention, wherein, a horizontal axis represents a spatial position coordinate (corresponding to FIG. 3), and a vertical axis represents liquid crystal phase retardation.

Exemplarily, the first substrate 1 and the second substrate 2 are both glass substrates. The first transparent electrode layer 5 comprises a plurality of strip transparent electrodes spaced apart from one another at an interval. During operation, in the liquid crystal lens as shown in FIG. 1, the first transparent electrode layer 5 and the second transparent electrode layer 7 are applied with a voltage so as to form an electric field and under the action of the electric field, liquid crystal molecules in the liquid crystal layer 3 may deflect. Further, there is a small voltage difference between two adjacent strip transparent electrodes of the first transparent electrode layer 5, so a lateral electric field is formed between the two adjacent transparent electrodes, so that the liquid crystal molecules close to the first transparent electrode 5 may laterally deflect; but in the embodiment, the liquid crystal molecules close to the first transparent electrode layer 5 are farther away from the first transparent electrode layer 5 due to addition of the planarization layer 6, so as to be located in a region where the electric field is relatively weaker, so a phenomenon of the phase deviation which is caused by the liquid crystal molecules being laterally deflected in a direction opposite to the pre-tilt direction due to the lateral electric field may be alleviated or even eliminated, which thus improves a refractive effect of the liquid crystal lens, and further improves the stereoscopic display effect. FIG. 4 shows a refractivity variation diagram in a horizontal cross-section plane of the liquid crystal lens provided by the embodiment of the present invention, and it can be seen from FIG. 4 that, reduction of liquid crystal phase deviation renders more continuous and milder refractivity variation of the liquid crystal.

Exemplarily, the first transparent electrode layer 5 and the second transparent electrode layer 7 are made of transparent conductive material, e.g., Indium Tin Oxide (ITO) and the like.

Exemplarily, the first alignment layer and the second alignment layer are made of alignment layer material known by the inventor of the present invention.

Figure 2:
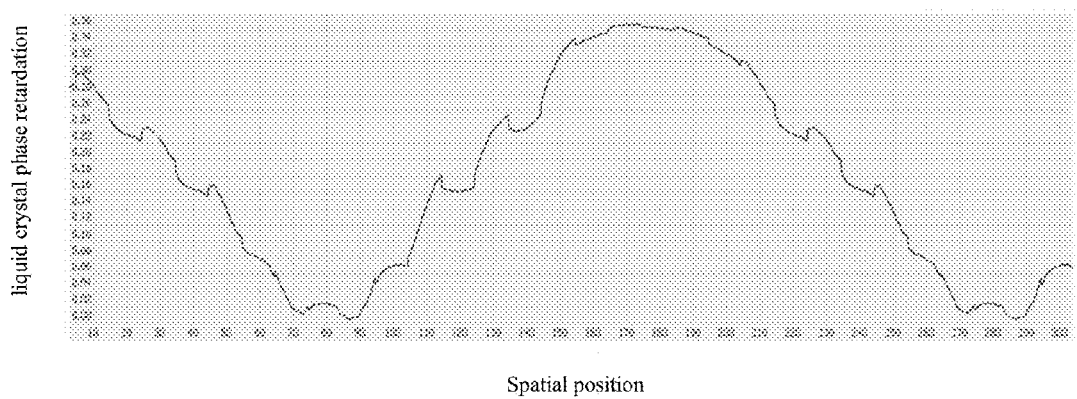
FIG. 2 is a refractivity variation diagram in a horizontal cross-section of the liquid crystal lens in prior art, wherein, a horizontal axis represents a spatial position coordinate (corresponding to FIG. 1), a vertical axis represents liquid crystal phase retardation.

In the conventional liquid crystal lens shown in FIG. 1, a relatively large voltage difference is formed between the first substrate 1 and the second substrate 2; a relatively small voltage difference is formed between the two adjacent transparent electrodes in the first transparent electrode layer 5 and the lateral electric field is formed between the two adjacent transparent electrodes, and an alignment direction of the first alignment layer 4 is not parallel to a direction of the lateral electric field, so the liquid crystal phase deviation is generated (see FIG. 2). In the embodiment, by forming the planarization layer 6 between the first transparent electrode layer 5 and the first alignment layer 4, the first alignment layer 4 is made to farther away from the first transparent electrode layer 5 by the planarization layer 6 and move to a region where the lateral electric field is relatively weaker, and thus reduces and even eliminates the liquid crystal phase deviation.

In the liquid crystal lens provided by the embodiment of the present invention, the plurality of transparent electrodes spaced apart from one another of the first transparent electrode layer 5 are separated by transparent insulating material which forms the planarization layer.

Exemplarily, the planarization layer 6 is made of transparent insulating resin material which is transparent and readily coated; and the embodiment of the present invention limits the material of the planarization layer 6, so that the added planarization layer 6 does not affect operation of the liquid crystal lens.

Exemplarily, the transparent insulating resin material used in the planarization layer includes photo-curable transparent resin photoresist or thermosetting acrylic resin, or the like.

Exemplarily, the planarization layer 6 has a thickness of 1 µm~5 µm, and the planarization layer within the thickness range renders insignificant increase of thickness of the liquid crystal lens, on the premise that the technical effect can be ensured, which will not affect user experience.

A Second Embodiment

An embodiment of the present invention further provides a fabrication method of a liquid crystal lens, the method comprising:

201: sequentially forming a first transparent electrode layer, a planarization layer and a first alignment layer on a first substrate;

In the embodiment of the present invention, the transparent electrode layer, the planarization layer and the first alignment layer are sequentially formed on the first substrate by a patterning process, wherein the patterning process includes exposing, developing, etching and so on, or includes printing, grid printing and so on.

Herein, the forming the planarization layer includes: forming the planarization layer by spin coating, depositing or printing.

Exemplarily, the planarization layer may be made of the transparent insulating resin material, such that the added planarization layer does not affect operation of the liquid crystal lens.

Exemplarily, the planarization layer added between the transparent electrode layer and the first alignment layer has a thickness of 1 µm~5 µm, so that an increase of thickness of the liquid crystal lens is not significant, on the premise that the technical effect is ensured, which will not affect user experience.

202: sequentially forming a second transparent electrode layer and a second alignment layer on a second substrate;

203: cell-assembling the first substrate provided with the first transparent electrode layer, the planarization layer and the first alignment layer thereon and the second substrate provided with the second transparent electrode layer and the second alignment layer thereon, and injecting liquid crystal, so as to form the liquid crystal lens.

Herein, the fabrication method of the second substrate is the same as that of the first substrate; after step 201, the second substrate provided with the second transparent electrode layer and the second alignment layer thereon is cell-assembled with the first substrate after the step 201; and after the cell-assembling is completed, the liquid crystal is injected between the first alignment layer and the second alignment layer, so as to form the liquid crystal lens.

With regard to the fabrication method of the liquid crystal lens provided by the embodiment of the present invention, by forming the planarization layer between the first transparent electrode layer and the first alignment layer, the first alignment layer is moved to a position where the lateral electric field is relatively weaker, and thus the liquid crystal phase deviation can be reduced and even eliminated, and a refractive effect of the liquid crystal lens can be improved.

Exemplarily, the first and the second transparent electrode layers, and the first and the second alignment layers may be formed by using common methods known by the inventor of the present invention.

A Third Embodiment

The embodiment of the present invention further provides a display device, comprising: a display panel, and the liquid crystal lens according to the first embodiment disposed on a light exiting side of the display panel. The display device may be, but not limited to, a three-dimensional stereoscopic display device.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201310745494.1 filed on Dec. 30, 2013, the disclosure of which is incorporated herein by reference in its entirety as part of the present application.

What is claimed is:

1. A liquid crystal lens, comprising:
a first substrate;
a second substrate, opposed to the first substrate;
a liquid crystal layer, interposed between the first substrate and the second substrate;
a first transparent electrode layer, located on a side of the first substrate close to the liquid crystal layer, the first transparent electrode layer comprises a plurality of strip transparent electrodes spaced apart from one another at a predetermined interval, such that a lateral electric field is formed between two adjacent strip transparent electrodes;
a planarization layer, wherein the planarization layer comprises a transparent insulating resin material, has a thickness in the range from 1 μm to 5 μm, the planarization layer covers a top surface and side surfaces of the strip transparent electrodes, and located on a side of the first transparent electrode layer close to the liquid crystal layer such that the lateral electric field is weaker;
a first alignment layer, located on a side of the planarization layer close to the liquid crystal layer;
a second transparent electrode layer, disposed on a side of the second substrate close to the liquid crystal layer; and
a second alignment layer, disposed on a side of the second transparent electrode layer close to the liquid crystal layer.

2. The liquid crystal lens according to claim 1, wherein the first transparent electrode layer comprises a plurality of transparent strip electrodes spaced apart from each other at an interval, and two adjacent transparent strip electrodes are separated by a transparent insulating resin material of the planarization layer.

3. The liquid crystal lens according to claim 1, wherein the second transparent electrode layer comprises a plurality of strip electrodes or comprises a plane electrode.

4. The liquid crystal lens according to claim 1, wherein the transparent insulating resin material is photo-curable transparent resin photoresist or thermosetting acrylic resin.

5. A fabrication method of a liquid crystal lens, comprising:
sequentially forming a first transparent electrode layer, a planarization layer and a first alignment layer on a first substrate, the first transparent electrode layer comprises a plurality of strip transparent electrodes spaced apart from one another at a predetermined interval, such that a lateral electric field is formed between two adjacent strip transparent electrodes, wherein the planarization layer comprises a transparent insulating resin material and has a thickness in the range from 1 μm to 5 μm, the planarization layer covers a top surface and side surfaces of the strip transparent electrodes, such that the lateral electric field is weaker;
sequentially forming a second transparent electrode layer and a second alignment layer on a second substrate;
cell-assembling the first substrate provided with the first transparent electrode layer, the planarization layer and the first alignment layer thereon and the second substrate provided with the second transparent electrode layer and the second alignment layer thereon, and injecting a liquid crystal, so as to form the liquid crystal lens.

6. The fabrication method according to claim 5, wherein the planarization layer is formed by spin coating, depositing or printing.

7. A display device, comprising:
a display panel; and
the liquid crystal lens according to claim 1, disposed on a light exiting side of the display panel.

* * * * *